(12) United States Patent
Xiao et al.

(10) Patent No.: US 12,469,134 B2
(45) Date of Patent: Nov. 11, 2025

(54) METHOD, SYSTEM AND COMPUTER READABLE MEDIUM FOR THREE-DIMENSIONAL RECONSTRUCTION OF TUMOR-AFFECTED TISSUE

(71) Applicant: Chengdu Wision Medical Device Co., Ltd., Sichuan (CN)

(72) Inventors: Xiao Xiao, Chengdu (CN); Xiaohai Xu, Chengdu (CN); Jingjia Liu, Chengdu (CN)

(73) Assignee: CHENGDU WISION MEDICAL DEVICE CO., LTD., Chengdu (CN)

( * ) Notice: Subject to any disclaimer, the term of this patent is extended or adjusted under 35 U.S.C. 154(b) by 308 days.

(21) Appl. No.: 18/482,198

(22) Filed: Oct. 6, 2023

(65) Prior Publication Data

US 2025/0037271 A1    Jan. 30, 2025

(51) Int. Cl.
*G06T 17/00* (2006.01)
*G06T 7/00* (2017.01)
*G06T 7/11* (2017.01)

(52) U.S. Cl.
CPC ............. *G06T 7/0012* (2013.01); *G06T 7/11* (2017.01); *G06T 2207/10056* (2013.01); *G06T 2207/30024* (2013.01); *G06T 2207/30096* (2013.01)

(58) Field of Classification Search
CPC ...................... G06T 7/0012; G06T 7/11; G06T 2207/10056; G06T 2207/30024; G06T 2207/30096; G06T 17/00; G06T 7/13; G06T 7/50; G06T 7/70; G06T 2207/30204; G06V 10/22
See application file for complete search history.

(56) References Cited

U.S. PATENT DOCUMENTS

2025/0139765 A1\* 5/2025 Kiemen ................ G06T 7/0012

OTHER PUBLICATIONS

Jansen, I., Lucas, M., Savci-Heijink, C.D. et al. Three-dimensional histopathological reconstruction of bladder tumours. Diagn Pathol 14, 25 (2019). https://doi.org/10.1186/s13000-019-0803-7 (Year: 2019).*

\* cited by examiner

*Primary Examiner* — Kent Yip
(74) *Attorney, Agent, or Firm* — Chieh-Mei Wang

(57) ABSTRACT

A method for three-dimensional reconstruction of a tumor-affected tissue is provided. The method includes the steps of: acquiring a plurality of slide images, each of which corresponds to a pathology section of the tumor-affected tissue; defining, on each of the slide images, at least one closed infiltration zone, the closed infiltration zone enclosing at least a portion of deep tissue in the pathology section; performing three-dimensional reconstruction by using the slide images having closed infiltration zones defined therein, thereby obtaining an infiltration space of the tumor-affected tissue; and determining three-dimensional occupancy of a tumor in the tumor-affected tissue, and defining a part of the tumor within the infiltration space as infiltrated, and defining another part of the tumor outside the infiltration space as non-infiltrated. A system and a computer readable medium for performing the three-dimensional reconstruction method are also provided.

20 Claims, 10 Drawing Sheets

METHOD, SYSTEM AND COMPUTER READABLE MEDIUM FOR THREE-DIMENSIONAL RECONSTRUCTION OF TUMOR-AFFECTED TISSUE

CROSS-REFERENCE TO RELATED APPLICATION

This application claims priority under 35 U.S.C. § 119 to Chinese Patent Application No. 202310933421.9, filed on Jul. 27, 2023, the entirety of which is incorporated herein by reference.

FIELD OF THE INVENTION

The present disclosure relates to artificial intelligence in medicine, and more particularly to a computer-implemented method, an artificial intelligent system, and a computer readable medium for three-dimensional reconstruction of a tumor-affected tissue.

BACKGROUND OF THE INVENTION

In recent years, three dimensional reconstruction technology has been widely used in clinical diagnosis and treatment, such as hepatobiliary surgery, plastic surgery, maxillofacial surgery, and orthopedics. Three-dimensional reconstruction technology allows acquisition of all-round, three-dimensional, and intelligent dynamic images or static images, high-resolution display of the spatial location and morphological structure of a lesion, and anatomical relationships of the lesion with its surrounding organs. Three-dimensional reconstruction presents a useful tool for preoperative planning, measurement, and calculation, simulated surgical operations, formulation of individualized treatment plans, and improvement of surgical accuracy and safety.

Tumor infiltration refers to the medical condition in which tumor cells damage the muscularis mucosa and penetrate into the deep tissues underneath the muscularis mucosa, e.g., the submucosa, muscularis, and adventitia. Preinvasive carcinoma without tumor infiltration may be cured by surgical resection. However, once tumor infiltration occurs, the possibility of postoperative recurrence or metastasis increases, and adjuvant treatments such as chemotherapy will be required.

However, existing three-dimensional tissue reconstruction methods adopt pathological detection algorithms only to determine the location of tumor cells, but not the spatial information of tumor infiltration. Therefore, there is a need for a three-dimensional tissue reconstruction method that displays the spatial information of tumor infiltration to allow formulation of individualized tumor treatment plans accordingly.

BRIEF SUMMARY OF THE INVENTION

One object of the present disclosure is to provide a method for three-dimensional reconstruction of a tumor-affected tissue. Said method defines at least one closed infiltration zone on each slide image, performs three-dimensional reconstruction using the slide images to obtain an infiltration space of the tumor-affected tissue, determines three-dimensional occupancy of a tumor in the tumor-affected tissue, and determines a part of the tumor located within the infiltration space as infiltrated and another part of the tumor located outside the infiltration space as non-infiltrated. The infiltration space obtained by the method provides spatial information of tumor infiltration at the tumor-affected tissue, thereby allows formulation of more individualized treatment plans for tumor patients.

The above-mentioned object is achieved by the following technical solutions:

A method for three-dimensional reconstruction of a tumor-affected tissue is provided. The method includes the steps of:

(S1) acquiring a plurality of slide images, each of which corresponds to a pathology section of the tumor-affected tissue;

(S2) defining, on each of the slide images, at least one closed infiltration zone, the closed infiltration zone enclosing at least a portion of deep tissue in the pathology section;

(S3) performing three-dimensional reconstruction by using the slide images having closed infiltration zones defined therein, thereby obtaining an infiltration space of the tumor-affected tissue; and (S4) determining three-dimensional occupancy of a tumor in the tumor-affected tissue, and defining a part of the tumor within the infiltration space as infiltrated, and defining another part of the tumor outside the infiltration space as non-infiltrated.

Specifically, in Step (S1), the tumor-affected tissue is sectioned at a constant distance according to existing sectioning procedures to obtain a plurality of pathology sections. Next, digital slide images of the pathology sections are generated by a pathology scanner and numbered according to the sectioning sequence. In one or more preferred embodiments, the distance between two adjacent pathology sections is 1-3 mm.

From surface to bottom, a tissue includes superficial tissue, muscularis mucosa, and deep tissue. The superficial tissue includes epithelium and lamina propria, and the deep tissue includes submucosa, muscularis, and adventitia. The condition in which tumor cells damage the muscularis mucosa and penetrate into the deep tissues underneath the muscularis mucosa is referred to as tumor infiltration. In Step (S2) of the embodiment of the present disclosure, at least one closed infiltration zone is defined on each of the slide images, and the location of tumor cells with respect to the closed infiltration zone is determined, thereby allows determination of the width and depth of tumor infiltration at the tumor-affected tissue.

In Step (S2), since the slide images correspond to different sections of the tumor-affected tissue, the infiltration zone needs to be marked on each of the slide images. In actual situations, the number and/or size of the infiltration zone defined on each slide image may vary; and some slide images may have an infiltration zone covering the entire slide image, while others may have no infiltration zone defined therein.

The infiltration zone is a closed zone having a regular or irregular contour; if tumor cells are determined to fall within the closed zone, tumor infiltration is determined. The closed infiltration zone may be defined by several ways. A preferred infiltration zone should enclose as much deep tissue as possible, while enclosing as little superficial tissue as possible. In some preferred embodiments, a marking line connected end-to-end is delineated roughly along the muscularis mucosa to obtain the closed infiltration zone, the interior of which is mainly the deep tissue shown in the pathology section. In one or more embodiments, the marking line is delineated along the periphery of the deep tissue. In one or more embodiments, an infiltration zone may enclose only one area of deep tissue. In one or more embodiments, an infiltration zone may enclose at least two areas of deep tissue.

In the embodiments of the present disclosure, the closed infiltration zone may be manually delineated by the physician, or be delineated on the slide image by using a neural network model trained with manually delineated slide images.

After the deep issue is defined by the closed infiltration zone, the tumor cells damaging the muscularis mucosa and penetrating into the deep tissue would locate within the infiltration zone, and the extent of tumor infiltration would be determined. As such, the width and depth of the tumor infiltration can be clearly shown in the reconstructed three-dimensional image of the tumor-affected tissue.

In Step (S3), three-dimensional reconstruction is performed by using the slide images having closed infiltration zones defined therein; the infiltration zone on each slide image forms an infiltration space in the tumor-affected tissue. The three-dimensional reconstruction may be carried out by existing three-dimensional reconstruction methods. For example, after the slide images are arranged in sequence, one of two adjacent slide images is stretched toward the other at a distance equal to the distance between the two adjacent slide images. Alternatively, a confocal laser scanning microscope may be used to perform the three-dimensional reconstruction; that is, along the axial direction of the tumor-affected tissue, a three-dimensional array is formed by using a plurality of two-dimensional slide image data based on the range of scanning and the distance of each longitudinal movement.

In Step (S4), after three-dimensional occupancy of a tumor in the tumor-affected tissue is determined, the coordinate of each point of the tumor is compared with the coordinates of the periphery of the infiltration space, thereby determining point-by-point the location of the tumor with respect to the infiltration space. The part of the tumor falling within the infiltration space is defined as infiltrated, whereas the other part of the tumor falling outside the infiltration space is defined as non-infiltrated. In some preferred embodiments, AI-assisted algorithm, such as FCN, ParseNet, DeConvNet, SegNet, HRNet, U-Net, or R-CNN, is used to identify and locate the position of the tumor in the tumor-affected tissue.

In the embodiments of the present disclosure, each slide image has at least one closed infiltration zone defined therein, thus the three-dimensionally reconstructed tumor-affect tissue has an infiltration space enclosing the deep tissue underneath the muscularis mucosa. As such, by observing the part of the tumor located inside the infiltration space, physicians are informed of the extent of tumor infiltration, and thus an individualized tumor treatment plan can be formulated.

In a preferred embodiment of the present disclosure, the Step (S2) of defining the closed infiltration zone includes the steps of: determining whether the muscularis mucosa in the pathology section is damaged by the tumor; the damage may be indicated by showing at least one damaged segment along the muscularis mucosa. If the muscularis mucosa is not damaged, the closed infiltration zone is formed by delineating along the muscularis mucosa. Alternatively, if the muscularis mucosa is damaged, whether at least one muscularis mucosa segment is present within the damaged segment is further determined.

If at least one muscularis mucosa segment is present within the damaged segment, a first complementary line is delineated to connect two endpoints of the damaged segment and cover the muscularis mucosa segment, thereby forming the closed infiltration zone. However, if no muscularis mucosa segment is present within the damaged segment, a second complementary line having two vertical segments and a connection segment and connecting two endpoints of the damaged segment is delineated to form the closed infiltration zone. The connection segment connects the two vertical segments and locates on a lateral side of the superficial tissue in the pathology section. The two vertical segments respectively extend from the two endpoints of the damaged segment and toward two endpoints of the connection segment in a direction perpendicular to an auxiliary line. The auxiliary line is a straight line between the two endpoints of the damaged segment.

Since the muscularis mucosa is the boundary between superficial tissues and deep tissues, it can be easily identified and located, and may be extracted as an image feature by image recognition technology. Therefore, in the embodiment of the present disclosure, the infiltration zone is preferably obtained by delineating the marking line along the muscularis mucosa in the pathology section. When the muscularis mucosa is continuous and forms a closed loop, the closed infiltration zone can be easily obtained by delineating the marking line along the muscularis mucosa. In one or more embodiments, if the continuous muscularis mucosa extends to the periphery of the pathology section, the marking line is delineated along the periphery of the pathology section to form the closed infiltration zone.

A continuous, non-damaged muscularis mucosa in the pathology section suggests that the section of the tissue has no tumor, or the tumor is remained within the superficial tissue and has yet damaged the muscularis mucosa, or tumor infiltration occurred other sections but not the present section. However, for pathology sections in which the muscularis mucosa is damaged by the tumor and discontinuous muscularis mucosa is shown, additional complementary line is needed to close the infiltration zone.

A type of tumor infiltration, in which the muscularis mucosa is discontinued by at least one damaged segment and at least one muscularis mucosa segment is present within the damaged segment, is referred to as penetrating infiltration and indicates moderate damage to the muscularis mucosa. In this case, a first complementary line is delineated to connect two endpoints of the damaged segment (i.e., the two endpoints where the muscularis mucosa is discontinued), thereby closing the infiltration zone. The first complementary line is delineated along the muscularis mucosa segment remained in the damaged segment, so as to form a closed infiltration zone that more precisely covers the deep tissue.

Another type of tumor infiltration, in which the muscularis mucosa is discontinued by at least one damaged segment but no muscularis mucosa segment is present within the damaged segment, is referred to as damaging infiltration and indicates serious damage to the muscularis mucosa. In this case, since the deep tissue cannot be well determined, an additional zone needs to be added as a part of the infiltration zone. Specifically, a second complementary line is delineated to connect two endpoints of the damaged segment. However, unlike the first complementary line which delineates along one or more muscularis mucosa segments, the second complementary line includes two vertical segments and a connection segment; the connection segment connects the two vertical segments and locates on a lateral side of the superficial tissue, and the two vertical segments of the second complementary line respectively extend from the two endpoints of the damaged segment and toward two endpoints of the connection segment. Namely, the vertical segments extend to the periphery of the superficial tissue. The direction of extension of the vertical segments is perpendicular to an auxiliary line, which is a straight line between the two endpoints of the damaged segment. As such, the additional zone formed by the second complementary line and the auxiliary line mainly encloses the tumor. Therefore, the infiltration zone can enclose the deep tissue more fully and thus reflect the extent of the tumor infiltration more accurately.

The preferred methods described above provide standardized procedures for defining a closed infiltration zone with high accuracy and reliability, and thus facilitate the application of neural network models on identification of tumor infiltration.

In a preferred embodiment of the present disclosure, the Step (S2) of defining the closed infiltration zone includes the step of: if the superficial tissue is present in the infiltration zone, delineating along the muscularis mucosa between the deep tissue and the superficial tissue in the infiltration zone to obtain an exclusion zone; and excluding the exclusion zone from the infiltration zone.

In actual operations, a slide image may contain multiple areas of superficial tissue, some of which may be located within the closed infiltration zone. In the embodiments of the present disclosure, if the superficial tissue is present in the infiltration zone, the closed exclusion zone is formed by delineating along the muscularis mucosa between the deep tissue and the superficial tissue in the infiltration zone. Next, the closed exclusion zone is excluded from the infiltration zone so as to reduce the amount of superficial tissue within the infiltration zone, thus increasing the proportion of deep tissue enclosed within the infiltration zone and infiltration space.

In a preferred embodiment of the present disclosure, the Step (S2) of defining the closed infiltration zone includes the step of: if muscularis mucosa is not present in the pathology section, determining whether the pathology section is deep tissue or superficial tissue. If the pathology section is deep tissue, the closed infiltration zone is formed by delineating along the periphery of the deep tissue. Alternatively, if the pathology section is superficial tissue, nothing needs to be delineated on the slide image.

Specifically, if the pathology section has no muscularis mucosa therein, the entire pathology section is either deep tissue or superficial tissue. In the case of deep tissue, the marking line is delineated along the periphery of the deep tissue (i.e., the periphery of the pathology section) to obtain the closed infiltration zone. In the case of superficial tissue, no infiltration zone needs to be defined on the slide image.

In a preferred embodiment of the present disclosure, the Step (S2) of defining the closed infiltration zone includes steps of: determining whether the pathology section has a blank zone which causes a blank segment to form on the muscularis mucosa. If the blank zone is present, a third supplementary line is delineated from an endpoint of the blank segment, along a boundary between the blank zone and the deep tissue, and to another endpoint of the blank segment, thereby forming the closed infiltration zone.

The pathology section does not cover the entire slide image. Thus, blank zones on the pathology section may cause one or more blank segments along the muscularis mucosa. As a result, the muscularis mucosa is discontinuous, and the infiltration zone cannot be closed. Therefore, the third supplementary line is required. In order to close the infiltration zone, the third supplementary line is delineated from one endpoint of the blank segment to another endpoint of the blank segment, and extends along the boundary between the blank zone and the deep tissue.

In the embodiments of the present disclosure, a complete and standardized method for defining the closed infiltration zone is provided. The method is performed based on visibility of the muscularis mucosa, completeness of the muscularis mucosa, and blank segments or damaged segments formed along the muscularis mucosa, so that a closed infiltration zone can always be obtained independent of the various conditions of the slide images, and can always enclose as much deep tissue as possible. As a result, the infiltration zone and infiltration space defined by the method are more accurate and reliable.

In a preferred embodiment of the present disclosure, the three-dimensional reconstruction method further includes the step of: generating a minimum bounding rectangle of the pathology section, defining a side of the minimum bounding rectangle close to the deep tissue as a bottom side, and defining two lateral sides perpendicular to the bottom side as a first lateral side and a second lateral side respectively; selecting a first point on the first lateral side and a second point on the second lateral side, wherein a straight line between the first point and the second point is parallel to the bottom side; and selecting a third point on one lateral side of the straight line between the first and second points and close to the deep tissue.

In this embodiment, after the slide image of the pathology section is obtained, the minimum bounding rectangle of the pathology section needs to be determined first; and then, a bottom side, and two opposite lateral sides are determined based on the minimum bounding rectangle. Next, the first point is selected on the first lateral side, and the second point is selected on the second lateral side. The first and second points selected on different slide image may vary, but the straight line between the first point and the second point must be parallel to the bottom side. In some preferred embodiments, the first point and the second point are two points on the deep tissue that are farthest apart from each other.

In the Step (S3) of performing three-dimensional reconstruction, arc tangent of the slope of the straight line between the first point and the second point can be calculated to obtain an angle α, $$-\frac{\pi}{2} < \alpha < \frac{\pi}{2},$$

between the straight line and the horizontal direction of the slide image. For example, when the first point is on the left side of the second point, a rotation angle β is equal to the angle α; alternatively, when the first point is on the right side of the second point, the rotation angle β is π+α. Particularly, if the straight line between the first and second points is perpendicular to the horizontal direction of the slide image (i.e., the slope of the straight line is infinite), the rotation angle β is $$-\frac{\pi}{2} \text{ or } \frac{\pi}{2}.$$

For instance, it the first point is above the second point, the rotation angle β is $$-\frac{\pi}{2};$$

alternatively, it the second point is above the first point, the rotation angle β is π/2. Consequently, one or more of the slide images can be adjusted to a same initial angle according to the rotation angle β by exiting technologies. In one or more embodiments, the slide images may be adjusted by affine transformation, in which the transformation parameter is set to be the rotation angle β. In one or more embodiments, all pixels of the target slide image are traversed, the position of each pixel on the target slide image is calculated according to the rotation angle β, and component values of each pixel can be constructed by bilinear interpolation.

The third point is selected on one lateral side of the straight line between the first and second points and is close to the deep tissue. The positions of the third points on different slide images may be identical or vary. In Step (S3), prior to performing the three-dimensional reconstruction, one or more of the slide images may be flipped according to the relative positions of the first point, the second point, and the third point. For example, if the first, second, and third points are distributed counterclockwise, the slide image needs not be flipped; alternatively, if the first, second, and third points are distributed clockwise, the slide image needs to be flipped. In some embodiments, in order to flip a rotated slide image upside down, the data of line n and line N−n+1 are exchanged sequentially; wherein N is the height of the slide image, and n=1, 2, 3, . . . , N/2, or other equivalent flip functions.

In a preferred embodiment of the present disclosure, the Step (S3) of performing three-dimensional reconstruction includes the steps of: determining a tissue contour and a minimum bounding rectangle thereof on each of the slide images, a center of the minimum bounding rectangle being a bias point; intercepting each slide image by a rectangular frame centered on the bias point; and reconstructing the tumor-affected tissue according to the sequence of the intercepted slide images and the distance between two adjacent intercepted slide images. The length of the rectangular frame is a maximum length among the minimum bounding rectangles on all of the slide images, and the width of the rectangular frame is a maximum width among the minimum bounding rectangles on all of the slide images.

In the embodiments of the present disclosure, the tissue contour on the rotated and/or flipped slide images can be determined manually by the physician, or extracted by existing digital image processing methods or deep learning methods. The rectangular frame has the maximum length and maximum width among the minimum bounding rectangles on all of the slide images. Each slide image is intercepted by the rectangular frame centered on the bias point. Next, the actual physical size of the intercepted slide images can be determined based on the micro per pixel (MMP) of the intercepted slide images. Finally, the two-dimensional slide images are reconstructed to form a three-dimensional image of the tumor-affected tissue according to the sequence of the intercepted slide images and the distance between two adjacent intercepted slide images.

Another object of the present disclosure is to provide an artificial intelligent system for three-dimensional reconstruction of a tumor-affected tissue by using the aforementioned methods. The system includes an input device for acquiring a plurality of slide images, each of which corresponds to a pathology section of the tumor-affected tissue; and a computing device in communication with the input device. The computing device includes a server having a processor and a memory coupled to the processor. The memory contains a computer program stored therein. When the computer program is executed, the processor is controlled to perform steps of:

(S1) acquiring the slide images from the input device;

(S2) defining, on each of the slide images, at least one closed infiltration zone, the closed infiltration zone enclosing at least a portion of deep tissue in the pathology section;

(S3) performing three-dimensional reconstruction by using the slide images having closed infiltration zones defined therein, thereby obtaining an infiltration space of the tumor-affected tissue; and (S4) determining three-dimensional occupancy of a tumor in the tumor-affected tissue, and defining a part of the tumor within the infiltration space as infiltrated, and defining another part of the tumor outside the infiltration space as non-infiltrated.

The system may further include a display device in communication with the computing device and configured to display the infiltrated and/or non-infiltrated tumor.

Specifically, the input device is configured to acquire a plurality of slide images of pathology sections. In some embodiments, the input device is a pathology scanner.

The processor is configured to define at least one closed infiltration zone on each slide image, so as to determine whether the tumor is infiltrating or non-infiltrating. A preferred infiltration zone should enclose as much deep tissue and less superficial tissue. The closed infiltration zone on the slide image having damaging infiltration should contain an additional zone that encloses at least a part of the tumor. In some embodiments, the processor uses a neural network model trained with manually delineated slide images to define the closed infiltration zone on the slide images. Moreover, the processor performs the three-dimensional reconstruction by using the slide images having closed infiltration zones defined therein to obtain three-dimensional models of the tumor-affected tissue and the infiltration space therein. In some embodiments, the processor may adopt existing methods such as confocal laser scanning microscopy based three-dimensional reconstruction; that is, along the axial direction of the tumor-affected tumor, a three-dimensional array is formed by using a plurality of two-dimensional slide image data based on the range of scanning and the distance of each longitudinal movement. The processor may use existing AI-assisted algorithm, such as FCN, ParseNet, DeConvNet, SegNet, HRNet, U-Net, or R-CNN, to identify and locate the position of the tumor in the tumor-affected tissue. The processor compares the coordinates of the tumor with the coordinates of the infiltration space, thereby determining point-by-point the location of the tumor with respect to the infiltration space. The processor further defines the part of the tumor falling within the infiltration space as infiltrated, and defines the other part of the tumor falling outside the infiltration space as non-infiltrated.

The display device is configured to display the infiltrated part and/or non-infiltrated part of the tumor in the tumor-affected tissue, and highlight the infiltrated part of the tumor for enhancing observation of the lesion.

The present disclosure also provides a non-transitory computer-readable medium for three-dimensional reconstruction of a tumor-affected tissue by using the aforementioned methods. The medium includes a computer program stored therein. When the computer program is executed, the device installing the non-transitory computer-readable medium is controlled to perform the methods described above.

As compared with the prior art, the embodiments provided in the present disclosure has the following advantages and beneficial effects:

1. The methods provided in the present disclosure define a closed infiltration zone on each slide image; thus, the three-dimensionally reconstructed tumor-affect tissue has an infiltration space enclosing the deep tissue, thereby providing physicians an enhanced view of the infiltrating tumor and a comprehensive assessment of the extent of tumor infiltration. Individualized tumor treatment plans may be formulated accordingly.
2. The methods of the present disclosure delineate along the muscularis mucosa to obtain the closed infiltration zone, thereby allowing quick and accurate delineation of the closed infiltration zone on the slide image. Additionally, a standardized procedure for delineating on slide images that show discontinuous muscularis mucosa caused by penetrating infiltration or damaging infiltration is provided to ensure accuracy and reliability of the method. The application of neural network models on identification of tumor infiltration is also facilitated.
3. The present disclosure provides a complete and standardized method for defining the closed infiltration zone. The method is performed based on visibility of the muscularis mucosa, completeness of the muscularis mucosa, and blank segments or damaged segments formed along the muscularis mucosa. As such, a closed infiltration zone can always be obtained independent of the various conditions of the slide images, and can always enclose as much deep tissue as possible. As a result, the infiltration zone and the infiltration space defined by the method are more accurate and reliable.
4. The methods of the present disclosure determines three points on each slide images, thereby allowing effective and accurate adjustment and/or flipping of the slide images and thus ensuring accuracy of three-dimensional reconstruction of tumor-affected tissues.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In the description of the present disclosure, it should be understood that terms for expressing direction such as front, rear, left, right, up, down, vertical, horizontal, high, low, inside, outside, etc. are used to explain the orientation or position with reference to the drawings, are intended merely to simplify the description of the present disclosure, rather than indicating or implying that the device or the element must be constructed or operated in such specific orientation or position, and therefore should not be construed as limiting the scope of the present disclosure.

Embodiment 1

Figure 1:
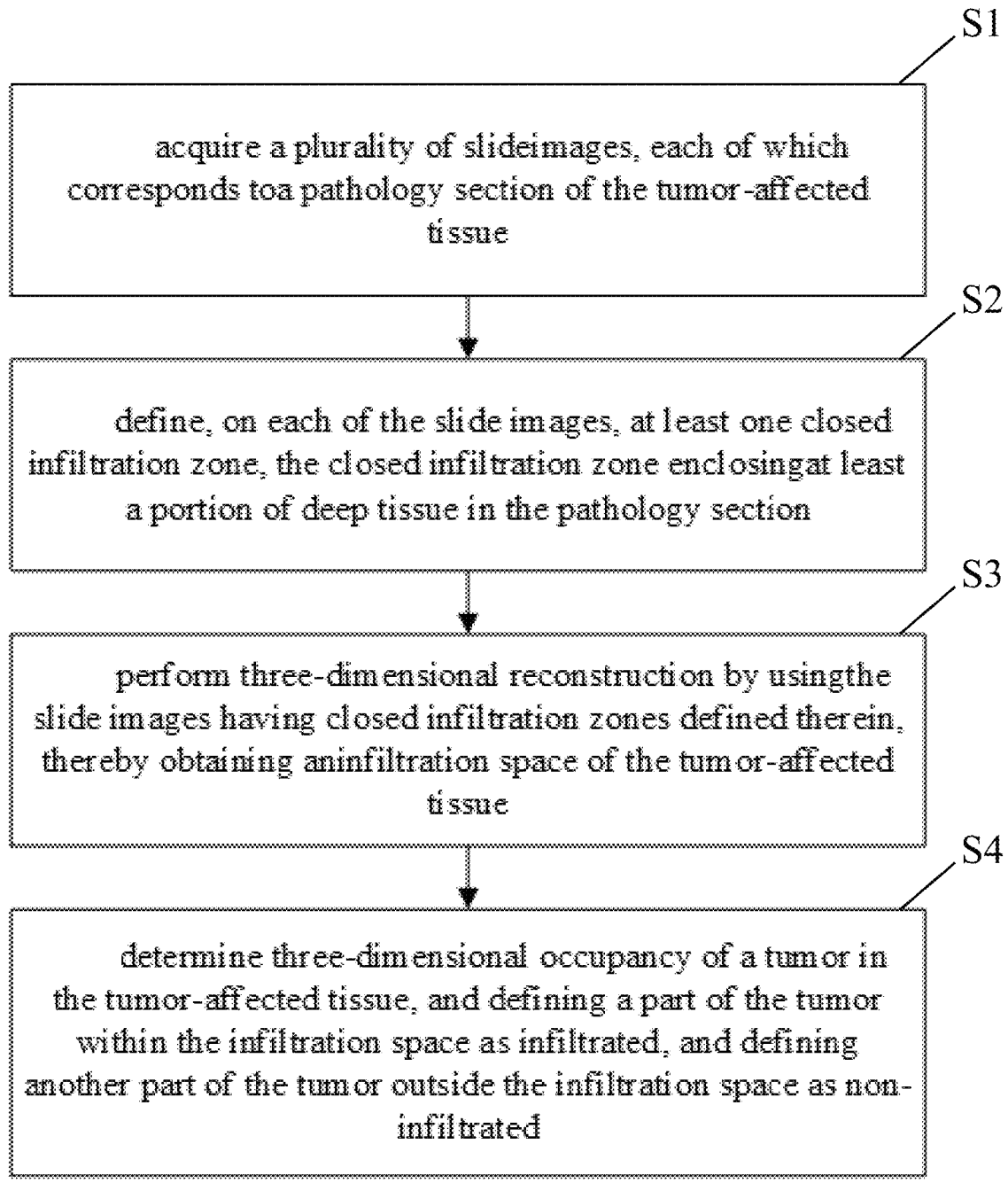
FIG. 1 is a flowchart of a method for three-dimensional reconstruction of a tumor-affected tissue according to an embodiment of the present disclosure.

As shown in FIG. 1, a method for three-dimensional reconstruction of a tumor-affected tissue is provided. The method includes the steps of:
(S1) acquiring a plurality of slide images, each of which corresponds to a pathology section of the tumor-affected tissue;
(S2) defining, on each of the slide images, at least one closed infiltration zone, the closed infiltration zone enclosing at least a portion of deep tissue in the pathology section;

(S3) performing three-dimensional reconstruction by using the slide images having closed infiltration zones defined therein, thereby obtaining an infiltration space of the tumor-affected tissue; and (S4) determining three-dimensional occupancy of a tumor in the tumor-affected tissue, and defining a part of the tumor within the infiltration space as infiltrated, and defining another part of the tumor outside the infiltration space as non-infiltrated.

In this embodiment, in Step (S2), a marking line is delineated on each slide image to form an infiltration zone that encloses at least a portion of the deep tissue in the pathology section. The shape or contour of the infiltration zone may be regular or irregular. However, the infiltration zone must be a closed zone.

In some preferred embodiments, a marking line connected end-to-end is delineated roughly along the muscularis mucosa to obtain the closed infiltration zone; the interior of the closed infiltration zone is mainly the deep tissue in the pathology section. In one or more embodiments, the marking line is delineated along the periphery of the deep tissue. In one or more embodiments, an infiltration zone may enclose only one area of deep tissue. In one or more embodiments, an infiltration zone may enclose at least two areas of deep tissue.

In one or more embodiments, the infiltration zone may also enclose a portion of the superficial tissue in the pathology section. In some embodiments where the pathology section is infiltrated by tumor, the infiltration zone delineated on the slide image may enclose not only the deep tissue, but also a portion of the tumor.

In some embodiments, the closed infiltration zone can be manually delineated by the physician, or be delineated on the slide image by using a neural network model trained with manually delineated slide images.

In some embodiments, the three-dimensional reconstruction may be carried out by existing three-dimensional reconstruction methods. For example, after the slide images are arranged in sequence, one of two adjacent slide images is stretched toward the other at a distance equal to the distance between the two adjacent slide images. Alternatively, a confocal laser scanning microscope may be used to perform the three-dimensional reconstruction; that is, along the axial direction of the tumor-affected tumor, a three-dimensional array is formed by using a plurality of two-dimensional slide image data based on the range of scanning and the distance of each longitudinal movement.

In some embodiments, AI-assisted algorithm, such as FCN, ParseNet, DeConvNet, SegNet, HRNet, U-Net, or R-CNN, is used to identify and locate the position of the tumor in the tumor-affected tissue.

Embodiment 2

In addition to the features of Embodiment 1, as shown in FIG. 2 through FIG. 5, this embodiment provides a standardized method for defining the infiltration zone. Specifically, the Step (S2) of defining the closed infiltration zone includes the step of: determining whether the muscularis mucosa in the pathology section is damaged by the tumor; the damage may be indicated by having at least one damaged segment along the muscularis mucosa. If the first muscularis mucosa is not damaged, the closed infiltration zone is formed by delineating along the muscularis mucosa. Alternatively, if the first muscularis mucosa is damaged, whether at least one muscularis mucosa segment is present within the damaged segment is further determined.

If at least one muscularis mucosa segment is present within the damaged segment, a first complementary line is delineated to connect two endpoints of the damaged segment and cover the muscularis mucosa segment, thereby forming the closed infiltration zone. However, if no muscularis mucosa segment is present within the damaged segment, a second complementary line having two vertical segments and a connection segment and connecting two endpoints of the damaged segment is delineated to form the closed infiltration zone. The connection segment connects the two vertical segments and locates on a lateral side of the superficial tissue in the pathology section. The two vertical segments respectively extend from the two endpoints of the damaged segment and toward two endpoints of the connection segment in a direction perpendicular to an auxiliary line. The auxiliary line is a straight line between the two endpoints of the damaged segment.

Figure 2:
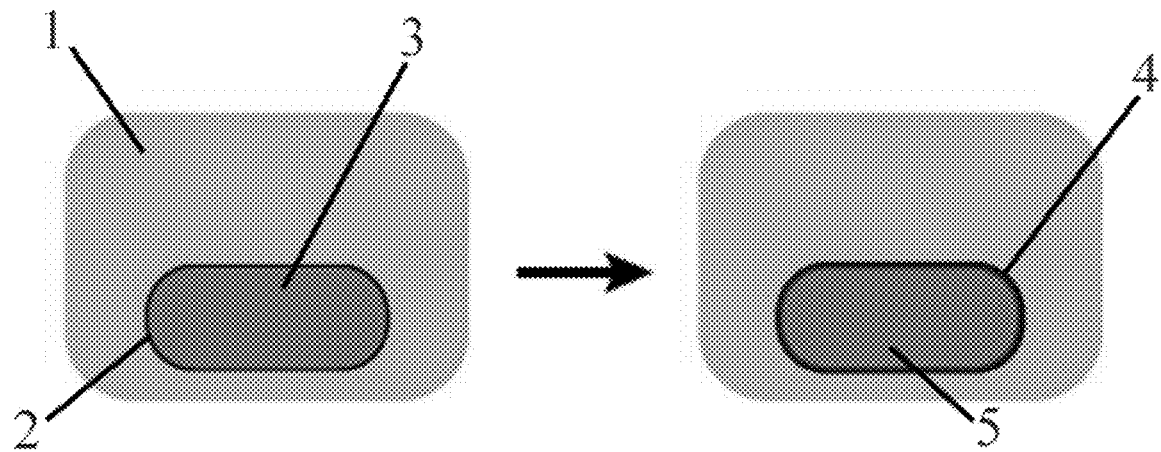
FIG. 2 schematically depicts a slide image having continuous and closed muscularis mucosa and another slide image having an infiltration zone defined therein according to an embodiment of the present disclosure.
Figure 3:
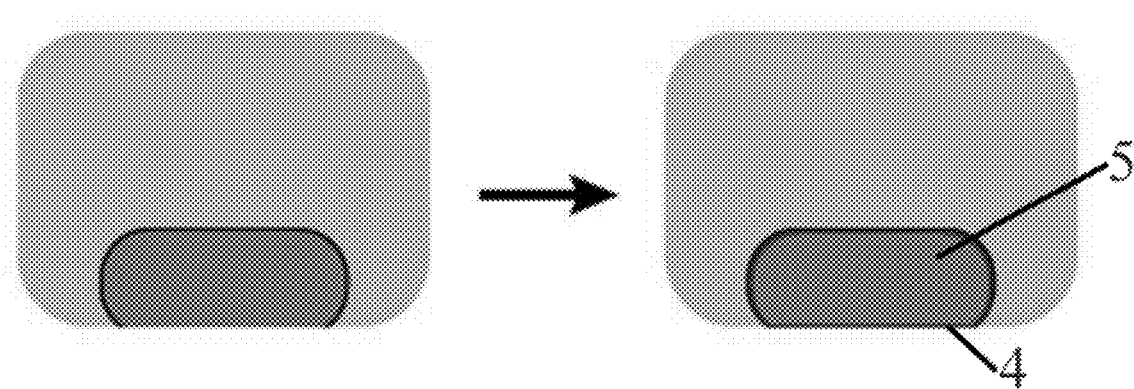
FIG. 3 schematically depicts a slide image having muscularis mucosa extended to a periphery of the slide image and another slide image having an infiltration zone defined therein according to an embodiment of the present disclosure.

As shown in FIG. 2, since the muscularis mucosa 2 is the boundary between superficial tissue 1 and deep tissue 3, it can be easily identified and located, and may be extracted as an image feature by image recognition technology. Therefore, when the muscularis mucosa 2 is continuous and closed, the closed infiltration zone 5 can be easily obtained by delineating the marking line 4 along the muscularis mucosa 2. In some embodiments, as shown in FIG. 3, if the continuous muscularis mucosa extends to the periphery of the pathology section, the marking line 4 extends along the periphery of the pathology section to form the closed infiltration zone 5.

Figure 4:
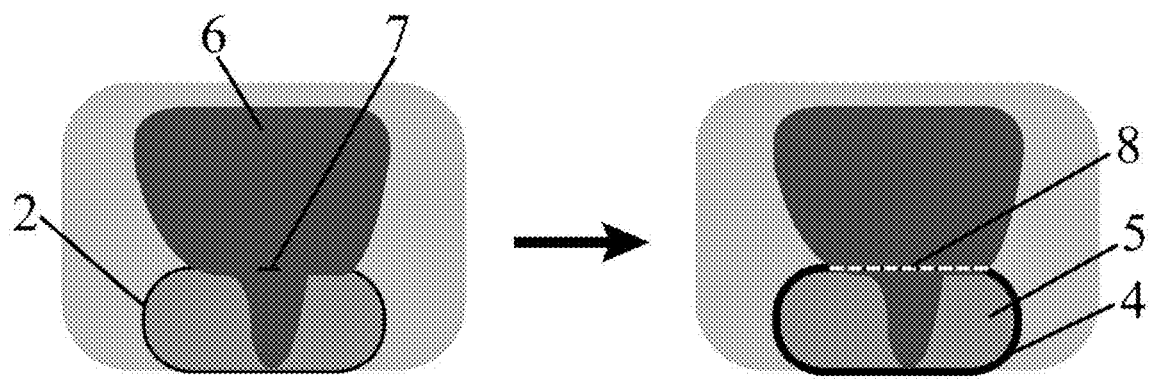
FIG. 4 schematically depicts a slide image having muscularis mucosa damaged by penetrating infiltration and another slide image having an infiltration zone defined therein according to an embodiment of the present disclosure.

In FIG. 4, in the case of penetrating infiltration, in which the muscularis mucosa 2 is discontinued by at least one damaged segment, at least one muscularis mucosa segment 7 would exist within the damaged segment along the muscularis mucosa 2. In this case, a first complementary line 8 is delineated to connect two endpoints of the damaged segment (i.e., the two endpoints where the muscularis mucosa is discontinued), thereby closing the marking line 4 to form a closed infiltration zone 5.

Figure 5:
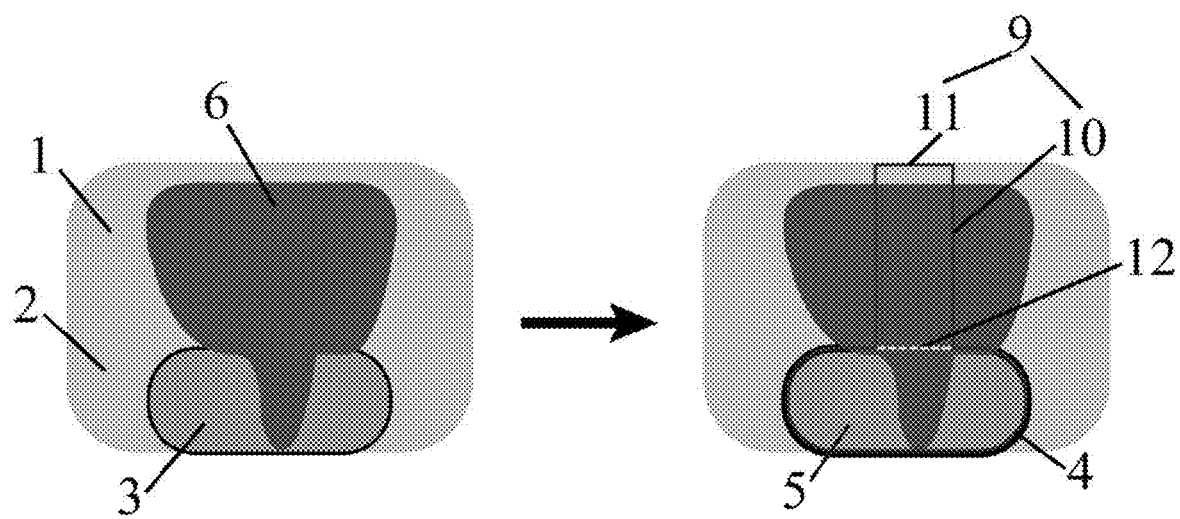
FIG. 5 schematically depicts a slide image having muscularis mucosa damaged by damaging infiltration and another slide image having an infiltration zone defined therein according to an embodiment of the present disclosure.

As shown in FIG. 5, in the case of damaging infiltration, the muscularis mucosa 2 is discontinued by at least one damaged segment but in absence of any muscularis mucosa segment within the damaged segment. In this case, a second complementary line 9 including two vertical segments 10 and a connection segment 11 connecting the endpoints of the two vertical segments 10 is delineated, so as to close the marking line 4 to form the closed infiltration zone 5. The two vertical segments 10 respectively extend from the two endpoints of the damaged segment and toward two endpoints of the connection segment in a direction perpendicular to an auxiliary line 12. The auxiliary line 12 is a straight line between the two endpoints of the damaged segment. As a result, the additional zone formed by the second complementary line and the auxiliary line mainly encloses the tumor. Therefore, the infiltration zone can enclose the deep tissue more fully and thus reflect the extent of the tumor infiltration more accurately.

In one or more embodiments, for slide images having more than two damaged segments along the muscularis mucosa, the first complementary line and the second complementary line may be separately delineated depending on whether at least one muscularis mucosa segment is present within the damaged segment.

In this embodiment, the first and second complementary lines are delineated according to a standardized procedure, so that a closed infiltration zone can be formed for both penetrating infiltration and damaging infiltration. Therefore, closed infiltration zones can be defined on slide images with high accuracy and reliability, and the application of trained neural network models on identification of tumor infiltration is facilitated.

Embodiment 3

Figure 6:
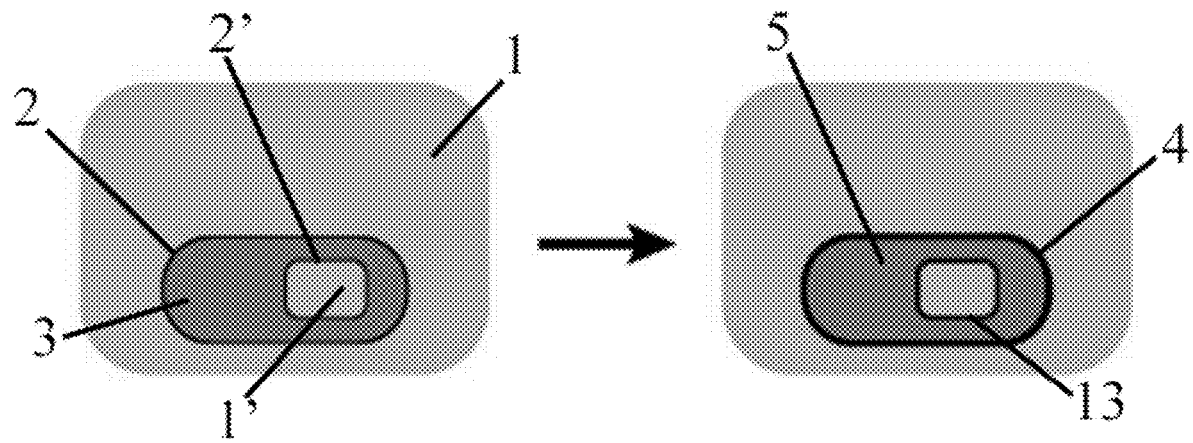
FIG. 6 schematically depicts a slide image having one muscularis mucosa located within another muscularis mucosa and enclosing superficial tissue, and another slide image having an infiltration zone and an exclusion zone according to an embodiment of the present disclosure.

In addition to the features of the aforementioned embodiments, the Step (S2) further includes the following steps to complete the standardized procedure for defining the infiltration zone. As shown in FIG. 6, if superficial tissue 1 is present within the deep tissue 3, the muscularis mucosa 2' between the deep tissue 3 and the superficial tissue 1' in the infiltration zone is delineated to obtain an exclusion zone 13. After the muscularis mucosa 2 is delineated by a marking line 4, the exclusion zone 13 is excluded from the closed infiltration zone 5.

Figure 7:
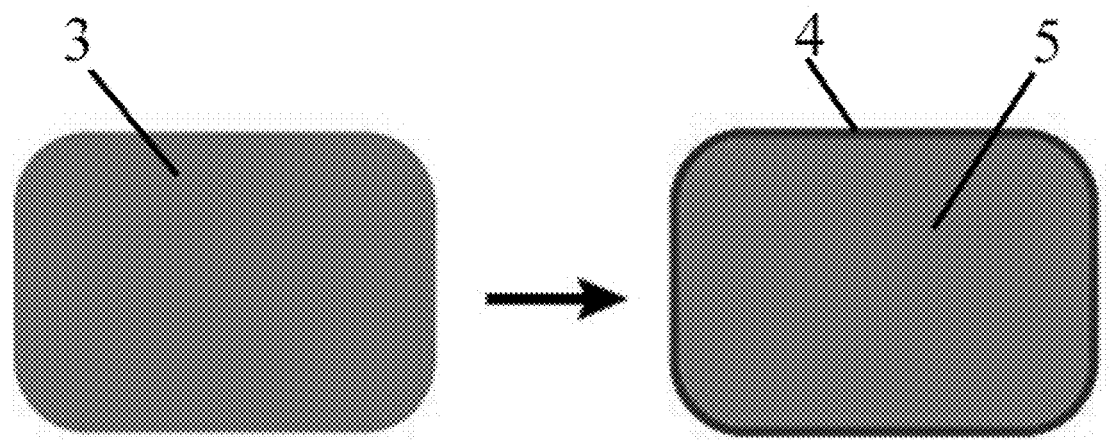
FIG. 7 schematically depicts a slide image showing deep tissue only and another slide image having an infiltration zone defined therein according to an embodiment of the present disclosure.

Furthermore, the step (S2) includes the step of: if muscularis mucosa is not present in the pathology section, determining whether the pathology section is deep tissue or superficial tissue. As shown in FIG. 7, if the pathology section is deep tissue 3, the closed infiltration zone 5 is formed by delineating the marking line 4 along the periphery of the deep tissue. Alternatively, if the pathology section is superficial tissue, nothing needs to be delineated on the slide image.

Figure 8:
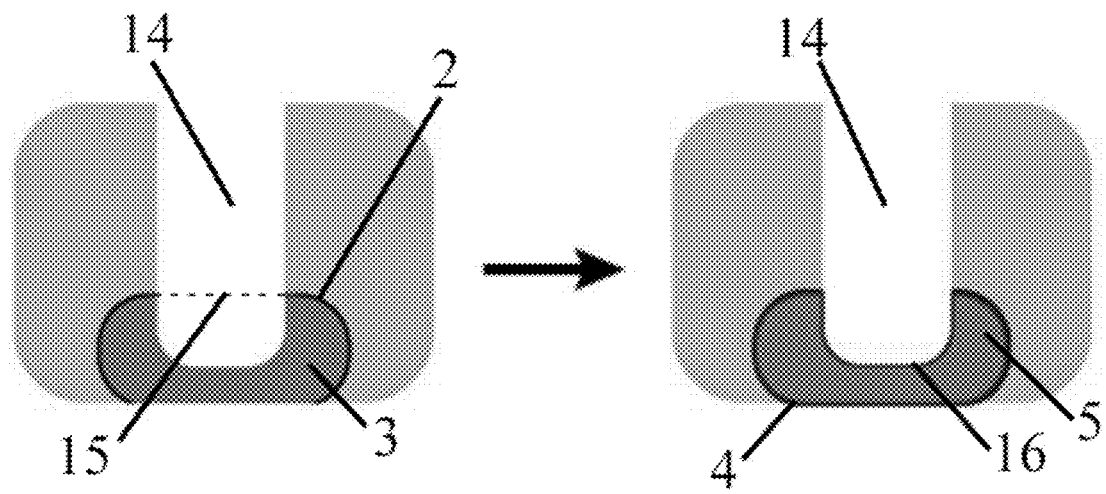
FIG. 8 schematically depicts a slide image having a blank zone and another slide image having an infiltration zone defined therein according to an embodiment of the present disclosure.

In FIG. 8, the step (S2) further includes the steps of: determining whether the pathology section has a blank zone 14 that causes a blank segment 15 to form on the muscularis mucosa 2. If the blank zone 14 is present, a third supplementary line 16 is delineated from an endpoint of the blank segment 15, along a boundary between the blank zone 14 and the deep tissue 3, and to another endpoint of the blank segment, thereby closing the marking line 4 and forming the closed infiltration zone 5.

Figure 9:
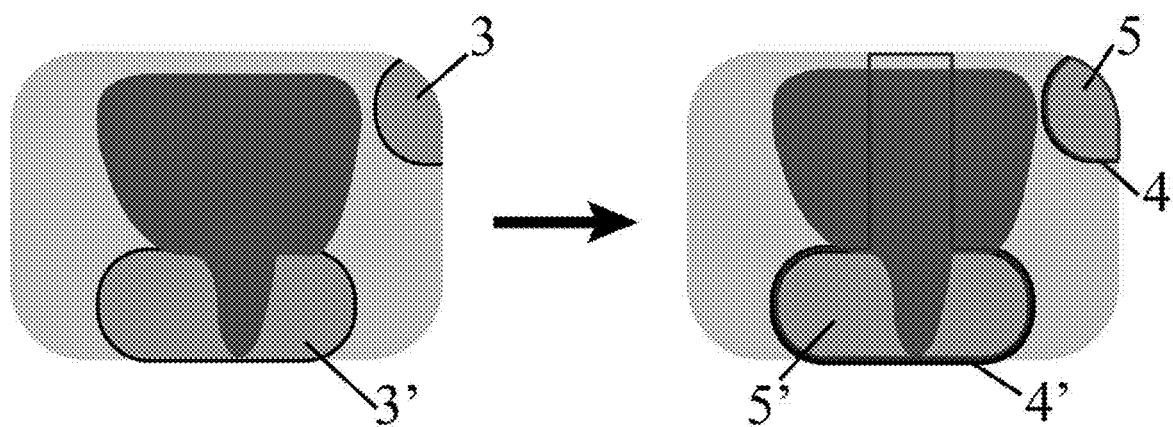
FIG. 9 schematically depicts a slide image having one continuous muscularis mucosa extended to a periphery of the slide image and another muscularis mucosa damaged by damaging infiltration, and another slide image having two infiltration zones defined therein according to an embodiment of the present disclosure.

As shown in FIG. 9, if the slide image has more than two areas of deep tissue 3, 3', two infiltration zones 5, 5' may be defined by delineating separately the marking lines 4, 4' according to the standardized procedure described in aforementioned embodiments.

In this embodiment, a complete and standardized method for defining the closed infiltration zone is provided. The method is performed based on visibility of the muscularis mucosa, completeness of the muscularis mucosa, and blank segments or damaged segments formed along the muscularis mucosa, so that a closed infiltration zone can always be obtained independent of the various conditions of the slide images, and can always enclose as much deep tissue as possible. As a result, the infiltration zone and the infiltration space defined by the embodiments of the present disclosure are more accurate and reliable.

Embodiment 4

Figure 10:
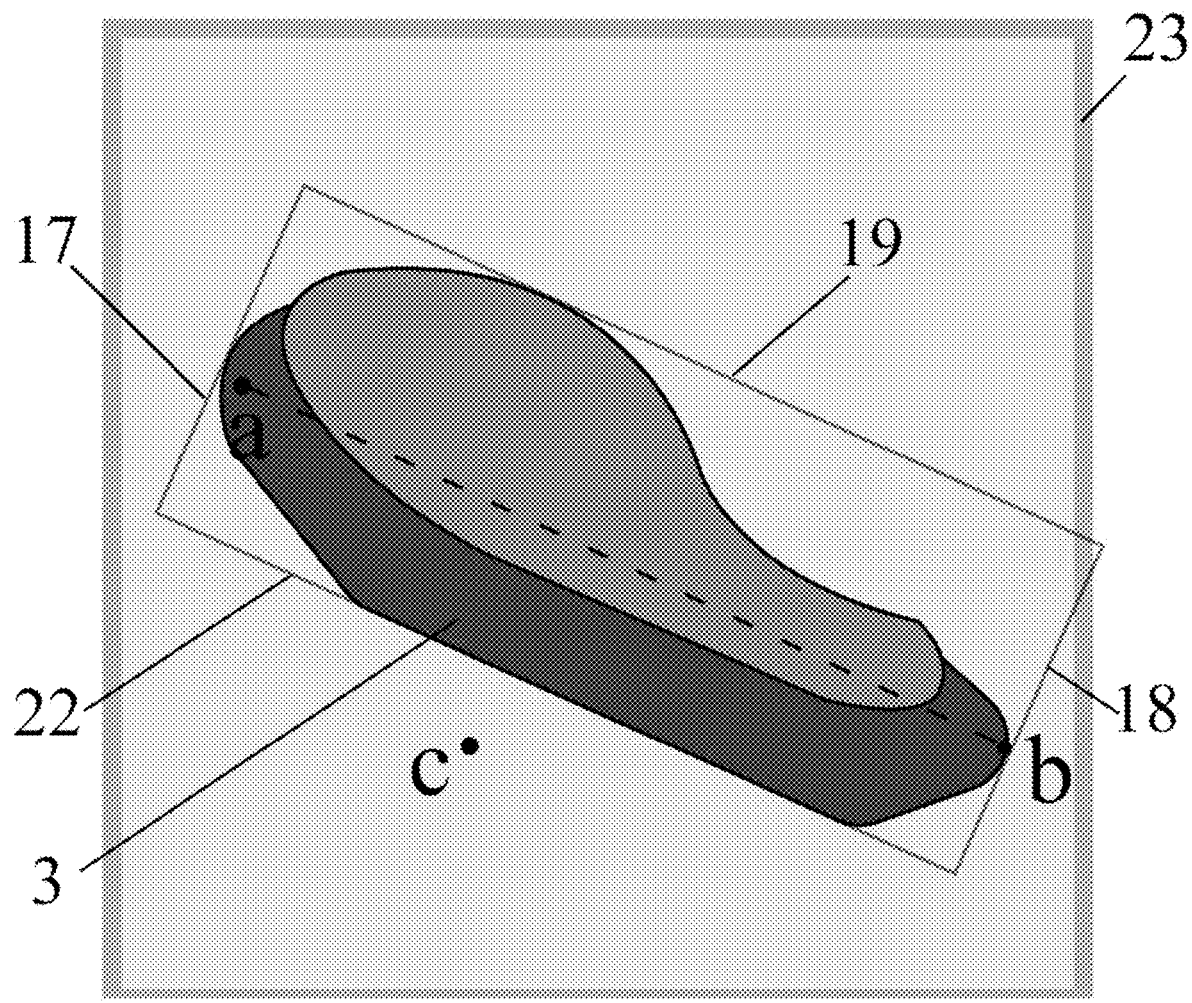
FIG. 10 schematically depicts a slide image marked with a first point, a second point, and a third point according to an embodiment of the present disclosure.

In addition to the features of the aforementioned embodiments, as shown in FIG. 10, the method further includes the step of: after a pathology section 23 is obtained, generating a minimum bounding rectangle 19 of the tissue on the pathology section, defining a side of the minimum bounding rectangle 19 close to the deep tissue 3 as a bottom side 22, and defining two lateral sides perpendicular to the bottom side as a first lateral side 17 and a second lateral side 18 respectively; selecting the first point a on the first lateral side 17 and the second point b on the second lateral side 18, wherein a straight line between the first point a and the second point b is parallel to the bottom side 22; and selecting a third point c on the lateral side of the straight line between the first and second points a, b and close to the deep tissue 3.

In this embodiment, after the slide image of the pathology section is obtained, the minimum bounding rectangle of the pathology section needs to be determined first; and then, a bottom side, and two opposite lateral sides are determined based on the minimum bounding rectangle. Next, the first point is selected on the first lateral side, and the second point is selected on the second lateral side. The first and second points selected on different slide images may vary, but the straight line between the first point and the second point must be parallel to the bottom side. In some preferred embodiments, the first point and the second point are two points on the deep tissue that are farthest apart from each other.

In some embodiments, the step (S3) of performing three-dimensional reconstruction further includes steps of: adjusting an angle of each of the slide images and/or flipping one or more of the slide images according to relative positions of the first point, the second point, and the third point.

In some embodiments, arc tangent of the slope of the straight line between the first and second points a, b can be calculated to obtain an angle $\alpha$, $$-\frac{\pi}{2} < \alpha < \frac{\pi}{2},$$

between the straight line and the horizontal direction of the slide image. For example, when the first point is on the left side of the second point, a rotation angle $\beta$ is equal to the angle $\alpha$; alternatively, when the first point is on the right side of the second point, the rotation angle $\beta$ is $\pi+\alpha$. Particularly, if the straight line the first and second points is perpendicular to the horizontal direction of the slide image (i.e., the slope of the straight line is infinite), the rotation angle $\beta$ is $$-\frac{\pi}{2} \text{ or } \frac{\pi}{2}.$$

For instance, if the first point is above the second point, the rotation angle $\beta$ is $$-\frac{\pi}{2};$$

alternatively, if the second point is above the first point, the rotation angle $\beta$ is $\pi/2$.

One or more of the slide images can be adjusted to a same initial angle according to the rotation angle $\beta$ by exiting technologies. In one or more embodiments, the slide images can be adjusted by affine transformation, in which the transformation parameter is set to be the rotation angle $\beta$. In one or more embodiments, all pixels of the target slide image are traversed, the position of each pixel on the target slide image is calculated according to the rotation angle $\beta$, and component values of each pixel can be constructed by bilinear interpolation.

One or more of the slide images may be flipped according to the relative positions of the first point, the second point, and the third point. For example, if the first, second, and third points are distributed counterclockwise, the slide image needs not be flipped; alternatively, if the first, second, and third points are distributed clockwise, the slide image needs to be flipped. In some embodiments, in order to flip the rotated slide image upside down, the data of line n and line N−n+1 are exchanged sequentially; wherein N is the height of the slide image, and n=1, 2, 3, . . . , N/2, or other equivalent flip functions.

Embodiment 5

In addition to the features of the aforementioned embodiments, the step (S3) further includes steps of: determining a tissue contour and a minimum bounding rectangle thereof on each of the slide images, a center of the minimum bounding rectangle being a bias point; intercepting each slide image by a rectangular frame centered on the bias point; and reconstructing the tumor-affected tissue according to the sequence of the intercepted slide images and the distance between two adjacent intercepted slide images. The length of the rectangular frame is a maximum length among the minimum bounding rectangles on all of the slide images, and the width of the rectangular frame is a maximum width among the minimum bounding rectangles on all of the slide images.

Figure 11:
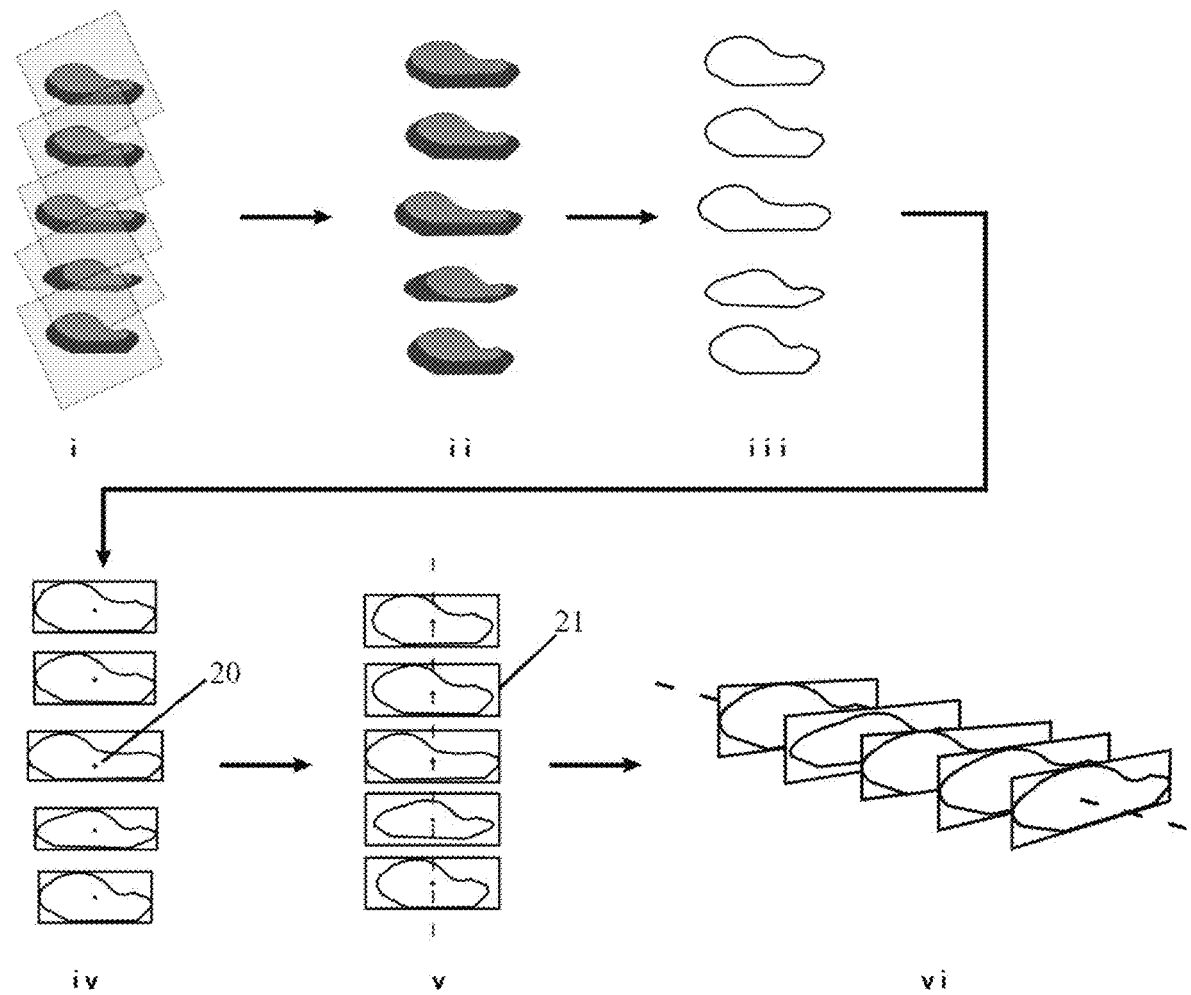
FIG. 11 is a flowchart of a method for three-dimensional reconstruction by using the slide images according to an embodiment of the present disclosure.

As steps (i) through (vi) shown in FIG. 11, after the slide images are adjusted and/or flipped (step i) and the background therein are suppressed (step ii), the contour of the tissue on each slide image is extracted by existing digital image processing methods or deep learning methods (step iii) and minimum bounding rectangles of the contours on the slide images are determined (step iv). The rectangular frame 21 has the maximum length and maximum width among the minimum bounding rectangles on all of the slide images. Each slide image is intercepted by the rectangular frame 21 centered on the bias point 20. Next, in step v, the actual physical sizes of the intercepted slide images can be calculated based on the micro per pixel (MMP) of the intercepted slide images. Finally, in step vi, the two-dimensional slide images are reconstructed to form a three-dimensional image of the tumor-affected tissue according to the sequence of the intercepted slide images and the distance between two adjacent intercepted slide images.

Embodiment 6

An artificial intelligent system for three-dimensional reconstruction of a tumor-affected tissue based on the aforementioned embodiments may include an input device, a computing device, and a display device. The input device is configured to acquire a plurality of slide images, each of which corresponds to a pathology section of the tumor-affected tissue. The computing device is in communication with the input device, and includes a server having a processor and a memory coupled to the processor. The memory contains a computer program stored therein. The display device is in communication with the computing device, and is configured to display the infiltrated and/or non-infiltrated tumor. When the computer program is executed, the processor is controlled to perform steps of:
  (S1) acquiring the slide images from the input device;
  (S2) defining, on each of the slide images, at least one closed infiltration zone, the closed infiltration zone enclosing at least a portion of deep tissue in the pathology section;
  (S3) performing three-dimensional reconstruction by using the slide images having closed infiltration zones defined therein, thereby obtaining an infiltration space of the tumor-affected tissue; and
  (S4) determining three-dimensional occupancy of a tumor in the tumor-affected tissue, and defining a part of the tumor within the infiltration space as infiltrated, and defining another part of the tumor outside the infiltration space as non-infiltrated.

In one or more embodiments, the input device is a pathology scanner.

In some embodiments, the processor uses a neural network model trained with manually delineated slide images to define one or more closed infiltration zones on the slide images.

In some embodiments, the processor may adopt existing methods such as confocal laser scanning microscopy based three-dimensional reconstruction; that is, along the axial direction of the tumor-affected tumor, a three-dimensional array is formed by using a plurality of two-dimensional slide image data based on the range of scanning and the distance of each longitudinal movement.

In some embodiments, the processor may uses existing AI-assisted algorithm, such as FCN, ParseNet, DeConvNet, SegNet, HRNet, U-Net, or R-CNN, to identify and locate the position of the tumor in the tumor-affected tissue.

Embodiment 7

A non-transitory computer-readable medium for three-dimensional reconstruction of a tumor-affected tissue by using the aforementioned embodiments may include a computer program stored therein; when the computer program is executed, the device installing the non-transitory computer-readable medium is controlled to perform the aforementioned methods.

In this embodiment, the computer program is configured to control the device to perform all or part of the three-dimensional reconstruction method. The computer program includes computer program codes, which may be source codes, object codes, executable files or other intermediate forms. The non-transitory computer-readable medium may include any entity or device, recording medium, USB flash drive, mobile hard disk, magnetic disk, optical disk, computer memory, read-only memory (ROM), random access memory (RAM), electrical carrier signal, telecommunication signal and software distribution medium.

Embodiment 8

In addition to the features of the aforementioned embodiments, the slide images having infiltration zones defined therein are used to reconstruct the three-dimensional structure of the tumor-affected tissue. Accordingly, the infiltration zones on the slide images form an infiltration space. The part of the tumor falling within the infiltration space is defined as infiltrated tumor, and the other part of the tumor outside the infiltration space is defined as non-infiltrated tumor.

Figure 12:
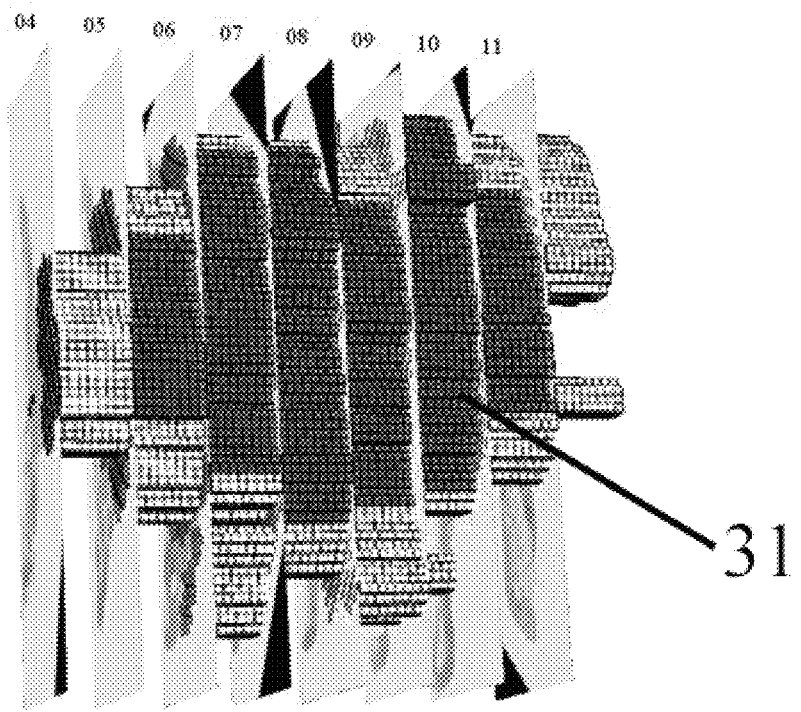
FIG. 12 depicts a three-dimensional image of a tumor in a tumor-affected tissue reconstructed based on the closed infiltration zones defined on multiple slide images according to an embodiment of the present disclosure.
Figure 13:
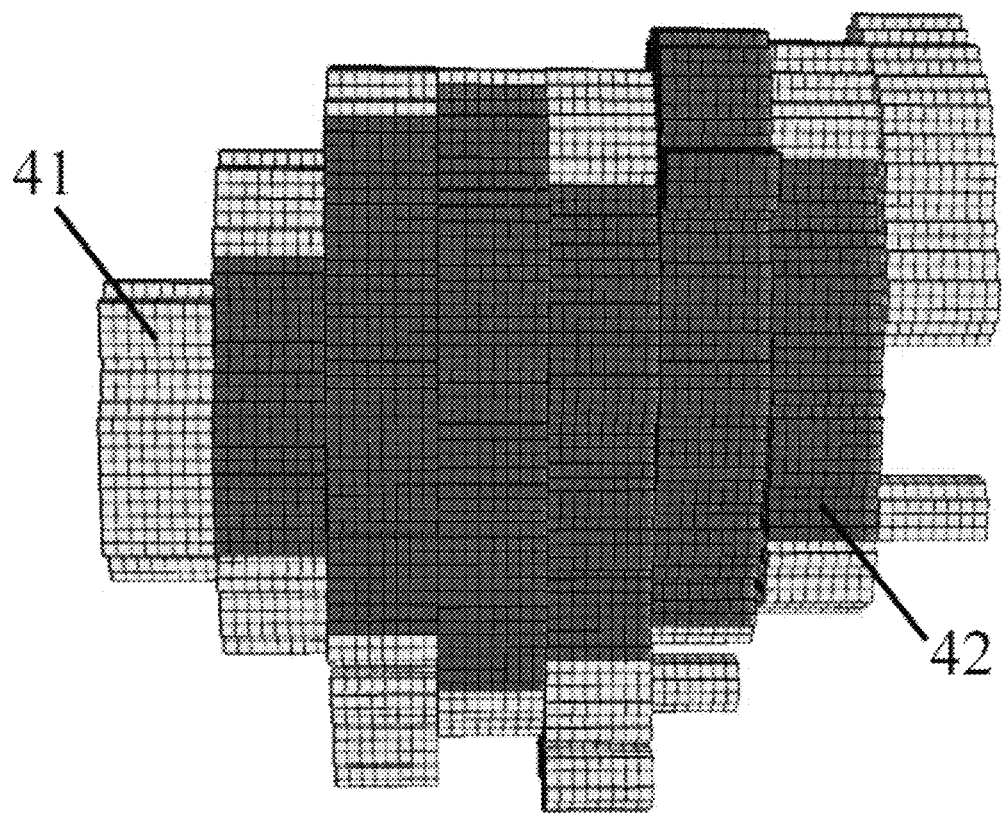
FIG. 13 depicts a top view of the tumor shown in FIG. 12, with the slide images being suppressed.
Figure 14:
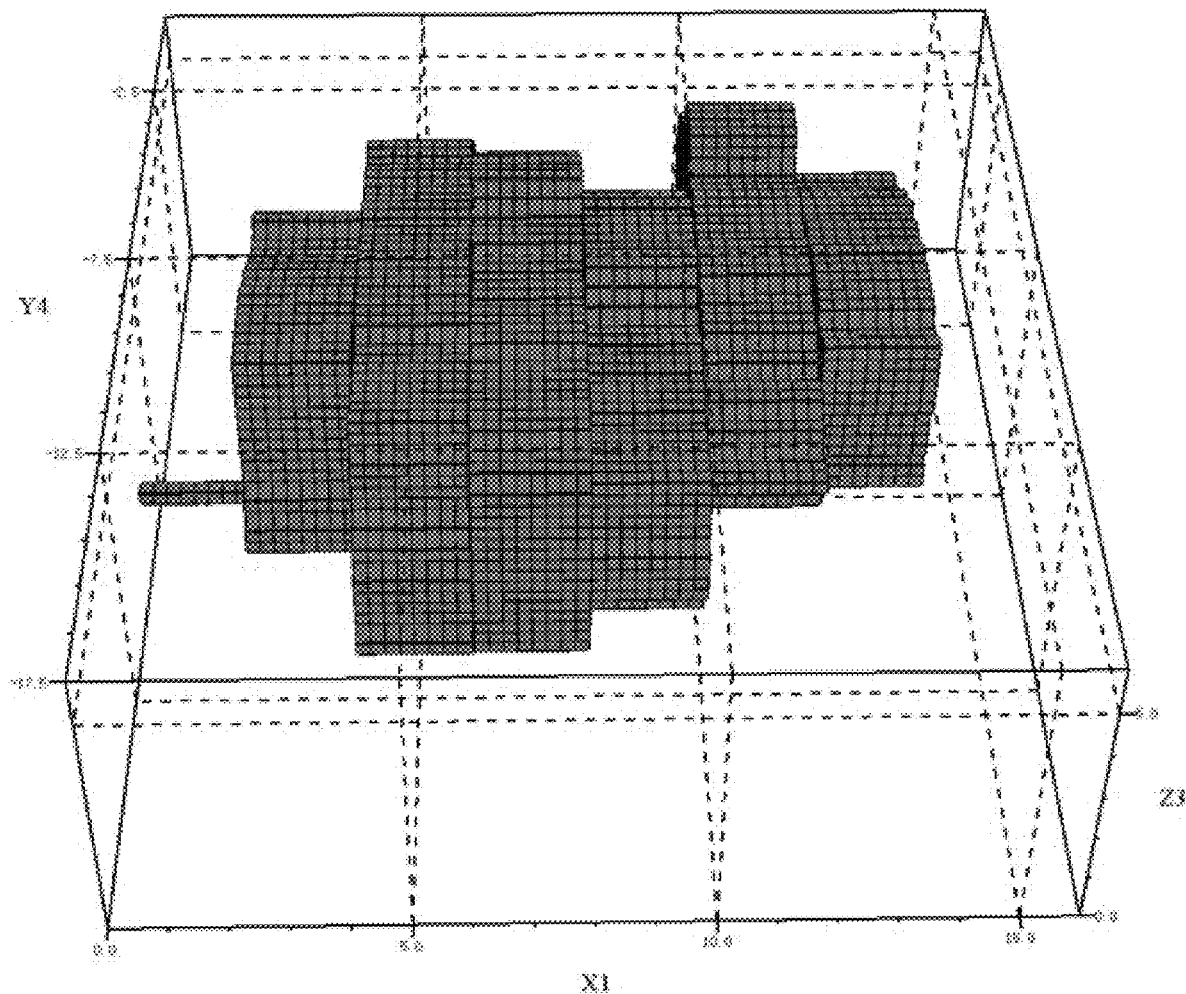
FIG. 14 depicts an isometric view of the tumor shown in FIG. 12, with the slide images and non-infiltrated part of the tumor being suppressed.

FIG. 12 through FIG. 14 show a tumor having an infiltrated part and a non-infiltrated part and three-dimensionally presented by using a software developed by the inventors. As shown in FIG. 12, the infiltration space 31 of the tumor-affected tissue was obtained by performing three-dimensional reconstruction on the slide images having closed infiltration zones defined therein 04-11. After the background of the slide images was suppressed, as shown in FIG. 13, the bright zone 41 indicates the non-infiltrated part of the tumor, and the dark zone 42 indicates the infiltrated part of the tumor. Additionally, as shown in FIG. 14, in order to enhance observation of the infiltration part, the noninfiltration part may be suppressed, and a three-dimensional coordinate system may be rendered.

Three-dimensional reconstruction of the infiltrated tumor allows not only a more detailed observation of tumor infiltration, but also a precise calculation of the volume of the infiltrated part. The precision of the volume of infiltrated tumor may also be adjusted according to the size of the mesh.

Terms such as "first", "second", "third" (e.g., first complementary line, second complementary line, third complementary line; first lateral side, second lateral side) used herein are merely distinguish the components for clear description, and do not intend to limit any sequence or emphasize the importance. In addition, the term "connect" used herein may refer to direct connection or indirect connection via other components.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for three-dimensional reconstruction of a tumor-affected tissue, comprising steps of:
   (S1) acquiring a plurality of slide images, each of which corresponds to a pathology section of the tumor-affected tissue;
   (S2) defining, on each of the slide images, at least one closed infiltration zone, the closed infiltration zone enclosing at least a portion of deep tissue in the pathology section;
   (S3) performing three-dimensional reconstruction by using the slide images having closed infiltration zones defined therein, thereby obtaining an infiltration space of the tumor-affected tissue; and
   (S4) determining three-dimensional occupancy of a tumor in the tumor-affected tissue, and defining a part of the tumor within the infiltration space as infiltrated, and defining another part of the tumor outside the infiltration space as non-infiltrated.

2. The method of claim 1, wherein the step of (S2) comprises:
   determining whether first muscularis mucosa in the pathology section is damaged by the tumor, the damage being indicated by having at least one damaged segment along the first muscularis mucosa;
   if the first muscularis mucosa is not damaged, delineating along the first muscularis mucosa to form the closed infiltration zone; or
   if the first muscularis mucosa is damaged, determining whether at least one muscularis mucosa segment is present within the damaged segment;
      if at least one muscularis mucosa segment is present within the damaged segment, delineating a first complementary line connecting two endpoints of the damaged segment and covering the muscularis mucosa segment, thereby forming the closed infiltration zone; or
      if no muscularis mucosa segment is present within the damaged segment, delineating a second complementary line comprising two vertical segments and a connection segment and connecting two endpoints of the damaged segment, thereby forming the closed infiltration zone,
   wherein the connection segment connecting the two vertical segments and locating on a lateral side of superficial tissue in the pathology section, the vertical segments respectively extend from the two endpoints of the damaged segment and toward two endpoints of the connection segment in a direction perpendicular to an auxiliary line, and the auxiliary line is a straight line between the two endpoints of the damaged segment.

3. The method of claim 2, wherein the step of (S2) comprises:
   if the superficial tissue is present in the infiltration zone, delineating along second muscularis mucosa between the deep tissue and the superficial tissue in the infiltration zone to obtain an exclusion zone, and excluding the exclusion zone from the infiltration zone.

4. The method of claim 2, wherein the step of (S2) comprises:
   if muscularis mucosa is not present in the pathology section, determining whether the pathology section is deep tissue or superficial tissue,
   if the pathology section is deep tissue, delineating along a periphery of the deep tissue to form the closed infiltration zone; or
   if the pathology section is superficial tissue, stop delineating.

5. The method of claim 2, wherein the step of (S2) comprises:
   determining whether the pathology section has a blank zone which causes a blank segment to form on the first muscularis mucosa,
   if the blank zone is present, delineating a third supplementary line from an endpoint of the blank segment, along a boundary between the blank zone and the deep tissue, and to another endpoint of the blank segment, thereby forming the closed infiltration zone.

6. The method of claim 1, further comprising:
   generating a minimum bounding rectangle of the pathology section, defining a side of the minimum bounding rectangle close to the deep tissue as a bottom side, and defining two lateral sides perpendicular to the bottom side as a first lateral side and a second lateral side respectively;
   selecting a first point on the first lateral side and a second point on the second lateral side, wherein a straight line between the first point and the second point is parallel to the bottom side; and
   selecting a third point on one lateral side of the straight line between the first and second points and close to the deep tissue.

7. The method of claim 6, wherein the step of (S3) further comprises:
   adjusting an angle of each of the slide images and/or flipping one or more of the slide images according to relative positions of the first point, the second point, and the third point, before performing the three-dimensional reconstruction.

8. The method of claim 1, wherein the step of (S3) comprises:
   determining a tissue contour and a minimum bounding rectangle thereof on each of the slide images, a center of the minimum bounding rectangle being a bias point;
   intercepting each slide image by a rectangular frame centered on the bias point; and reconstructing the tumor-affected tissue according to a sequence of the intercepted slide images and a distance between two adjacent intercepted slide images, wherein a length of the rectangular frame is a maximum length among the minimum bounding rectangles on all of the slide images, and a width of the rectangular frame is a maximum width among the minimum bounding rectangles on all of the slide images.

9. A system for three-dimensional reconstruction of a tumor-affected tissue, comprising:
an input device for acquiring a plurality of slide images, each of which corresponds to a pathology section of the tumor-affected tissue;
a computing device in communication with the input device, the computing device comprising a server having a processor and a memory coupled to the processor, the memory having a computer program stored therein, wherein when the computer program is executed, the processor is controlled to perform steps of:
(S1) acquiring the slide images from the input device;
(S2) defining, on each of the slide images, at least one closed infiltration zone, the closed infiltration zone enclosing at least a portion of deep tissue in the pathology section;
(S3) performing three-dimensional reconstruction by using the slide images having closed infiltration zones defined therein, thereby obtaining an infiltration space of the tumor-affected tissue; and
(S4) determining three-dimensional occupancy of a tumor in the tumor-affected tissue, and defining a part of the tumor within the infiltration space as infiltrated, and defining another part of the tumor outside the infiltration space as non-infiltrated; and
a display device in communication with the computing device and configured to display the part of the tumor within and/or outside the infiltration space.

10. The system of claim 9, wherein when the computer program is executed, the processor is controlled to perform the step of (S2) by:
determining whether first muscularis mucosa in the pathology section is damaged by the tumor, the damage being indicated by having at least one damaged segment along the first muscularis mucosa;
if the first muscularis mucosa is not damaged, delineating along the first muscularis mucosa to form the closed infiltration zone; or
if the first muscularis mucosa is damaged, determining whether at least one muscularis mucosa segment is present within the damaged segment;
if at least one muscularis mucosa segment is present within the damaged segment, delineating a first complementary line connecting two endpoints of the damaged segment and covering the muscularis mucosa segment, thereby forming the closed infiltration zone; or
if no muscularis mucosa segment is present within the damaged segment, delineating a second complementary line comprising two vertical segments and a connection segment and connecting two endpoints of the damaged segment, thereby forming the closed infiltration zone,
wherein the connection segment connecting the two vertical segments and locating on a lateral side of superficial tissue in the pathology section, the vertical segments respectively extend from the two endpoints of the damaged segment and toward two endpoints of the connection segment in a direction perpendicular to an auxiliary line, and the auxiliary line is a straight line between the two endpoints of the damaged segment.

11. The system of claim 10, wherein when the computer program is executed, the processor is controlled to perform the step of (S2) by:
if the superficial tissue is present in the infiltration zone, delineating along second muscularis mucosa between the deep tissue and the superficial tissue in the infiltration zone to obtain an exclusion zone, and excluding the exclusion zone from the infiltration zone.

12. The system of claim 10, wherein when the computer program is executed, the processor is controlled to perform the step of (S2) by:
if muscularis mucosa is not present in the pathology section, determining whether the pathology section is deep tissue or superficial tissue,
if the pathology section is deep tissue, delineating along a periphery of the deep tissue to form the closed infiltration zone; or
if the pathology section is superficial tissue, stop delineating.

13. The system of claim 10, wherein when the computer program is executed, the processor is controlled to perform the step of (S2) by:
determining whether the pathology section has a blank zone which causes a blank segment to form on the first muscularis mucosa,
if the blank zone is present, delineating a third supplementary line from an endpoint of the blank segment, along a boundary between the blank zone and the deep tissue, and to another endpoint of the blank segment, thereby forming the closed infiltration zone.

14. The system of claim 9, wherein when the computer program is executed, the processor is controlled to perform the step of (S3) by:
determining a tissue contour and a minimum bounding rectangle thereof on each of the slide images, a center of the minimum bounding rectangle being a bias point;
intercepting each slide image by a rectangular frame centered on the bias point; and
reconstructing the tumor-affected tissue according to a sequence of the intercepted slide images and a distance between two adjacent intercepted slide images,
wherein a length of the rectangular frame is a maximum length among the minimum bounding rectangles on all of the slide images, and a width of the rectangular frame is a maximum width among the minimum bounding rectangles on all of the slide images.

15. A non-transitory computer-readable medium for three-dimensional reconstruction of a tumor-affected tissue, comprising a computer program stored therein, wherein when the computer program is executed, a device installing the non-transitory computer-readable medium is controlled to perform steps of:
(S1) acquiring a plurality of slide images, each of which corresponds to a pathology section of the tumor-affected tissue;
(S2) defining, on each of the slide images, at least one closed infiltration zone, the closed infiltration zone enclosing at least a portion of deep tissue in the pathology section;
(S3) performing three-dimensional reconstruction by using the slide images having closed infiltration zones defined therein, thereby obtaining an infiltration space of the tumor-affected tissue; and (S4) determining three-dimensional occupancy of a tumor in the tumor-affected tissue, and defining a part of the tumor within the infiltration space as infiltrated, and defining another part of the tumor outside the infiltration space as non-infiltrated.

16. The medium of claim 15, wherein when the computer program is executed, the device installing the non-transitory computer-readable medium is controlled to perform the step of (S2) by:
determining whether first muscularis mucosa in the pathology section is damaged by the tumor, the damage being indicated by having at least one damaged segment along the first muscularis mucosa;
if the first muscularis mucosa is not damaged, delineating along the first muscularis mucosa to form the closed infiltration zone; or
if the first muscularis mucosa is damaged, determining whether at least one muscularis mucosa segment is present within the damaged segment;
  if at least one muscularis mucosa segment is present within the damaged segment, delineating a first complementary line connecting two endpoints of the damaged segment and covering the muscularis mucosa segment, thereby forming the closed infiltration zone; or
  if no muscularis mucosa segment is present within the damaged segment, delineating a second complementary line comprising two vertical segments and a connection segment and connecting two endpoints of the damaged segment, thereby forming the closed infiltration zone,
  wherein the connection segment connecting the two vertical segments and locating on a lateral side of superficial tissue in the pathology section, the vertical segments respectively extend from the two endpoints of the damaged segment and toward two endpoints of the connection segment in a direction perpendicular to an auxiliary line, and the auxiliary line is a straight line between the two endpoints of the damaged segment.

17. The medium of claim 16, wherein when the computer program is executed, the device installing the non-transitory computer-readable medium is controlled to perform the step of (S2) by:
if the superficial tissue is present in the infiltration zone, delineating along second muscularis mucosa between the deep tissue and the superficial tissue in the infiltration zone to obtain an exclusion zone, and excluding the exclusion zone from the infiltration zone.

18. The medium of claim 16, wherein when the computer program is executed, the device installing the non-transitory computer-readable medium is controlled to perform the step of (S2) by:
if muscularis mucosa is not present in the pathology section, determining whether the pathology section is deep tissue or superficial tissue,
if the pathology section is deep tissue, delineating along a periphery of the deep tissue to form the closed infiltration zone; or
if the pathology section is superficial tissue, stop delineating.

19. The medium of claim 16, wherein when the computer program is executed, the device installing the non-transitory computer-readable medium is controlled to perform the step of (S2) by:
determining whether the pathology section has a blank zone which causes a blank segment to form on the first muscularis mucosa,
if the blank zone is present, delineating a third supplementary line from an endpoint of the blank segment, along a boundary between the blank zone and the deep tissue, and to another endpoint of the blank segment, thereby forming the closed infiltration zone.

20. The medium of claim 17, wherein when the computer program is executed, the device installing the non-transitory computer-readable medium is controlled to further perform the steps of:
generating a minimum bounding rectangle of each pathological section, defining a side of the pathological section close to the deep tissue as a bottom side, and defining two sides of the pathological section perpendicular to the bottom side as a first side and a second side respectively;
selecting a first point near the first side and a second point near the second side, wherein a connection line connecting the first point and the second point is parallel to the bottom side;
selecting a third point close to the deep tissue on one side of the connection line; and
adjusting an angle of each slide image and/or flipping the slide image according to relative positions of the first point, the second point, and the third point before performing the three-dimensional reconstruction.

* * * * *